United States Patent [19]

Van Tiem et al.

[11] 4,152,051
[45] May 1, 1979

[54] EYEGLASSES

[76] Inventors: Joseph S. Van Tiem, 1779 E. Brocker Rd., Metamora, Mich. 48455; Florentine Van Tiem, 280 N. Washington, Oxford, Mich. 48051

[21] Appl. No.: 823,967
[22] Filed: Aug. 12, 1977
[51] Int. Cl.$^2$ .............................................. G02C 9/02
[52] U.S. Cl. .................................... 351/59; 351/123; 351/155
[58] Field of Search ............... 351/19, 47, 57, 155, 351/123, 48, 58, 60, 59

[56] References Cited

U.S. PATENT DOCUMENTS 3,495,898  2/1970  Del Vecchio .................. 351/123 X
3,531,187  9/1970  Brown ................................. 351/19

FOREIGN PATENT DOCUMENTS 452266  8/1936  United Kingdom ................... 351/47

Primary Examiner—Paul A. Sacher
Attorney, Agent, or Firm—Barnes, Kisselle, Raisch & Choate

[57] ABSTRACT

Eyeglasses comprising a headband adapted to encircle the head of a wearer, an eyeglass frame, and a pivot support removably mounted on the headband and supporting the eyeglass frame for incremental movements to positions into and out of the line of sight of the wearer.

9 Claims, 3 Drawing Figures

EYEGLASSES

This invention relates to eyeglasses.

BACKGROUND AND SUMMARY OF THE INVENTION

In the use of conventional glasses, a common problem has been the irritation to the nose and ears because of the rubbing and slipping of the eyeglass frame and ear pieces on the facr of the wearer as well as the indentations and permanent marks made by the eyeglasses on the bridge of the nose of the wearer.

The present invention is intended to obviate the aforementioned problems and afford comfortable eyeglasses which permit the user to use the eyeglasses when required and move them out of the way when not required.

In accordance with the invention, a headband is provided to encircle the head of the wearer and the eyeglass frame is pivoted by support to the headband in a manner that it can be incrementally moved from a position in the line of sight of the wearer to successive positions into and out of the line of sight of the wearer.

DESCRIPTION

Figure 1:
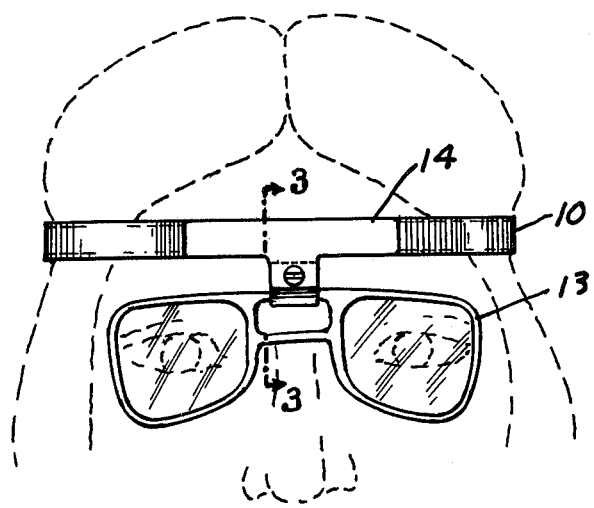
FIG. 1 is a front elevational view of an eyeglass frame embodying the invention.
Figure 2:
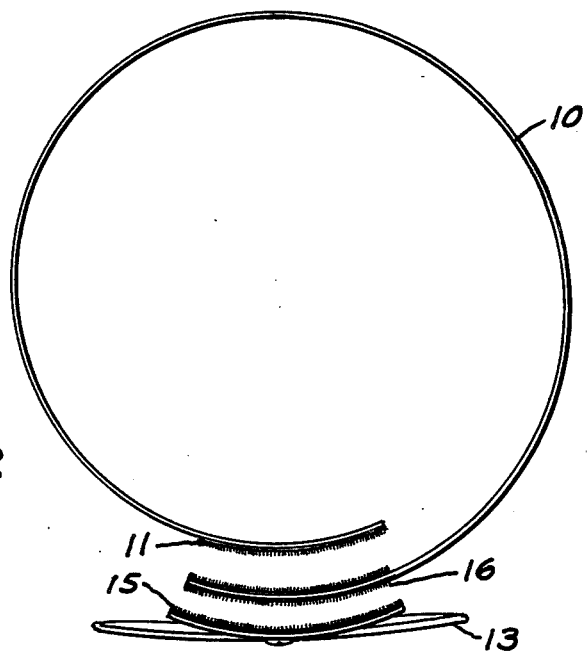
FIG. 2 is a plan view showing parts broken away.
Figure 3:
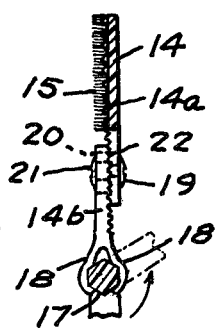
FIG. 3 is a sectional view taken along the line 3—3 in FIG. 1.

Referring to FIGS. 1-3, the eyeglasses embodying the invention comprise a head encircling band 10, the ends of which are provided with a first set of cooperating Velcro pads 11, 12 so that the band can encircle the head of the wearer. An eyeglass frame 13 which supports a pair of lenses is pivotally supported on the headband by a support member 14 which is provided with a Velcro self-engaging pad 15 cooperating with a Velcro self-engaging pad 16 on the end of the band 10. In this manner, the eyeglass frame can be readily mounted or removed from the headband.

The eyeglass frame 13 is preferably provided with a hexagonal cross sectional portion 17 in the area of the bridge connecting the two lens portions which is engaged by spaced fingers 18 on the support 14. The fingers 18 include cooperating flat portions that hold the frame in any adjusted position. A wearer may grasp the frame and swing it causing the arms 18 to flex outwardly until they once again engage surfaces of the polygonal portion 17. In this manner, the frame is incrementally moved between positions in the line of sight and successive positions out of the line of sight.

In order to provide for adjustment to the face of different users, provision is made in the support 14 for changing the distance between the headband 10 and the frame 13 and comprises making the support 14 out of two parts 14a, 14b and having a screw 19 that extends through a slot 20 in the part 14b and is threaded into a cooperating nut 21. The adjacent surfaces of portions 14a, 14b are provided with complimentary horizontal serrations 22 that assist in holding the portions 14a, 14b in any adjusted position.

It can thus be seen that there has been provided eyeglasses which obviate the problems with conventional frames and yet provide an attractive appearance. The frame can be readily mounted or removed from the headband. Also, the frame can be readily adjusted and will be held in any adjusted position relative to the head of the wearer as may be desired to take care of myopic or farsighted conditions.

We claim:

1. Eyeglasses comprising,
   a headband adapted to encircle the head of the wearer,
   an eyeglass frame for supporting a pair of lenses,
   and means for supporting the eyeglass frame on the headband in a manner that the eyeglass frame is pivoted to the headband and may be incrementally moved to discrete successive positions into and out of the line of sight and held in each of said positions wherein said means for supporting said frame comprises a pivot support member mounted on said headband, said member having spaced flexible arms, said eyeglass frame having a portion with a polygonal cross section, said arms extending about said polygonal cross sectional portion and having cooperating surfaces engaging portions of said polygonal cross section such that when the eyeglass frame is grasped and rotated with respect to the arms, the arms will flex permitting the eyeglass frame to be moved in increments to discrete successive positions.

2. The combination set forth in claim 1 including a first self-engaging strip on said headband, a second cooperating self-engaging strip engaging said first self-engaging strip, and means for mounting said pivot support on said first self-engaging strip.

3. The combination set forth in claim 1 wherein said support comprises a first part and a second part, said spaced arms forming part of said second part, and interengaging means between said first and second parts for vertically adjusting said second part relative to said first part.

4. The combination set forth in claim 3 wherein said last-mentioned interengaging means comprises horizontal serrations on said first and second parts of said support and fastener means holding said parts in any adjusted position.

5. Eyeglasses comprising,
   a headband adapted to encircle the head of the wearer,
   an eyeglass frame for supporting a pair of lenses,
   and means for removably supporting the eyeglass frame on the headband in a manner that the eyeglass frame is pivoted to the headband and may be moved to successive positions into and out of the line of sight and held in each of said positions,
   said last-mentioned means comprising interengaging first and second self-engaging strips on the headband and frame, respectively wherein said means for supporting said frame comprises a pivot support member on which said second strip is mounted for engagement with said first strip on said headband, said member having spaced flexible arms, said eyeglass frame having a portion with a polygonal cross section, said arms extending about said polygonal cross sectional portion and having cooperating surfaces engaging portions of said polygonal cross section such that when the eyeglass frame is grasped and rotated with respect to the arms, the arms will flex permitting the eyeglass frame to be moved in increments to successive positions.

6. The combination set forth in claim 5 wherein said support comprises a first part and a second part, said spaced arms forming part of said second part, and interengaging means between said first and second parts for vertically adjusting said second part relative to said first part.

7. The combination set forth in claim 6 wherein said last-mentioned interengaging means comprises horizontal serrations on said first and second parts of said support and fastener means holding said parts in any adjusted position.

8. Eyeglasses comprising, a headband adapted to encircle the head of the wearer, an eyeglass frame for supporting a pair of lenses, and means for supporting the eyeglass frame on the headband in a manner that the eyeglass frame is pivoted to the headband and may be moved to successive positions into and out of the line of sight and held in each of said positions, said last-mentioned means comprising a support having a first part mounted on said headband and a second part on which said frame is pivoted, and interengaging means between said first and second parts for vertically adjusting said second part relative to said first part.

9. The combination set forth in claim 8 wherein said last-mentioned interengaging means comprises horizontal serrations on said first and second parts of said support and fastener means holding said parts in any adjusted position.